United States Patent
Dillinger

(10) Patent No.: US 7,748,784 B2
(45) Date of Patent: Jul. 6, 2010

(54) HEIGHT ADJUSTABLE HEADREST FOR A VEHICLE SEAT

(75) Inventor: Thomas Dillinger, Wermelskirchen (DE)

(73) Assignee: Johnson Controls GmbH, Burscheid (DE)

(*) Notice: Subject to any disclaimer, the term of this patent is extended or adjusted under 35 U.S.C. 154(b) by 260 days.

(21) Appl. No.: 10/593,132

(22) PCT Filed: Jan. 28, 2005

(86) PCT No.: PCT/EP2005/000848

§ 371 (c)(1),
(2), (4) Date: Aug. 29, 2008

(87) PCT Pub. No.: WO2005/097546

PCT Pub. Date: Oct. 20, 2005

(65) Prior Publication Data

US 2008/0303334 A1    Dec. 11, 2008

(30) Foreign Application Priority Data

Mar. 19, 2004  (DE) .................. 10 2004 013 979

(51) Int. Cl.
*A47C 7/36* (2006.01)
(52) U.S. Cl. ............................................. 297/410
(58) Field of Classification Search ............ 297/410, 297/391, 463.1
See application file for complete search history.

(56) References Cited

U.S. PATENT DOCUMENTS

| 398,893 | A | * | 3/1889 | Gould | 297/409 |
| 3,223,447 | A | * | 12/1965 | Terracini | 297/397 |
| 5,775,777 | A | * | 7/1998 | Delling | 297/410 |

FOREIGN PATENT DOCUMENTS

| DE | 199 54 862 A1 | 8/2000 |
| EP | 0 798 158 A2 | 10/1997 |
| EP | 0 953 476 A1 | 11/1999 |
| FR | 2 756 789 A1 | 6/1998 |
| FR | 2 763 293 A1 | 11/1998 |
| FR | 2 823 808 A1 | 10/2002 |

OTHER PUBLICATIONS

International Search Report for PCT/EP2005/000848, date of mailing, Jun. 6, 2005, 3 pages.

* cited by examiner

*Primary Examiner*—Milton Nelson, Jr.
(74) *Attorney, Agent, or Firm*—Foley & Lardner LLP

(57) ABSTRACT

There is provided a device for fixing a component, in particular a headrest in or on a vehicle whereby the component includes at least one fixing bar. The fixing bar may be displaced relative to the device in a first direction essentially parallel to the longitudinal extension thereof. The device includes a tolerance compensation member in contact with the fixing bar. The tolerance compensation member may be displaced in a second direction relative to the device, running essentially perpendicular to the first direction.

13 Claims, 2 Drawing Sheets

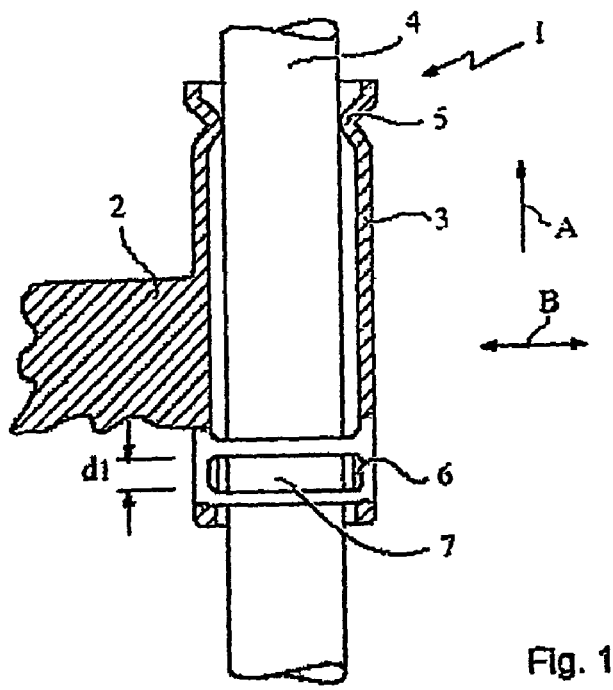
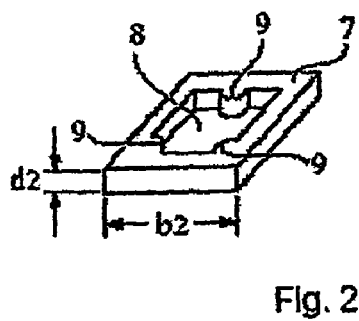
Fig. 2
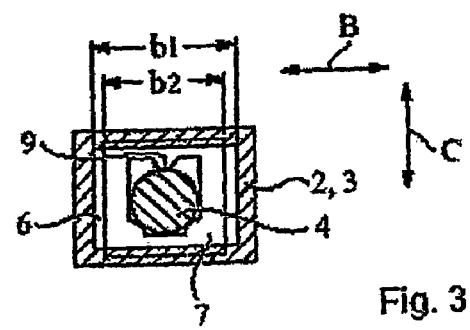
Fig. 3

HEIGHT ADJUSTABLE HEADREST FOR A VEHICLE SEAT

CROSS-REFERENCE TO RELATED PATENT APPLICATIONS

This Application claims priority to PCT/EP2005/00848, filed Jan. 28, 2005 and published Oct. 20, 2005 and to Germany Application 10 2004 013 979.2, filed Mar. 19, 2004 including the specification, drawings, claims and abstract of each, which are incorporated herein by reference in its entirety.

BACKGROUND OF THE INVENTION

The invention relates to a device for fixing a component, in particular a headrest in a vehicle, the component being assigned at least one fixing bar being displaceable relative to the device in a first direction running essentially parallel to its longitudinal extent.

SUMMARY OF THE INVENTION

Devices of this type are generally known. There are namely guide devices or fixing devices for headrests in motor vehicles. Fixing or guide devices of this type serve to guide and to lock the two guide bars which protrude from a customary headrest in order to adjust the height of the headrest. It is known that, during the production of any components, in particular for motor vehicles, dimensional tolerances or arrangement tolerances of the various individual parts of the components occur. In the example of a headrest as a component for a vehicle, it may happen that the fixing bars are, to a small extent, not arranged parallel to each other or else they are arranged at too great or too small a spacing. Tolerances of this type then lead to a height adjustment of a headrest of this type requiring too much effort. This has an overall adverse effect on the use of the headrest. It is also the case, however, that the fixing bars of headrests of this type must not be held in the fixing devices or in the guide devices with too great an amount of play (i.e., too loosely) because, firstly, they could start to rattle, for example during vibration of the vehicle, or could generally start to move in an undesirable manner and, secondly, such mobility leads undesirably to anesthetic impairment because the sense of value of a motor vehicle component of this type is thereby reduced.

One embodiment of the invention relates to a device for fixing a component, in particular a headrest for use in or on a vehicle, which, firstly, can be adjusted in height comparatively easily or in general can be adjusted along the fixing bars of the component and, secondly, permits a sufficiently stable fixing of the component.

One embodiment of the invention relates to a device for fixing a component, in particular a headrest for use in or on a vehicle, the component including at least one fixing bar, the fixing bar being displaceable relative to the device in a first direction running essentially parallel to its longitudinal extent, the fixing device having a tolerance compensation member which is in contact with the fixing bar, and the tolerance compensation member being displaceable in relation to the fixing device in a second direction aligned essentially perpendicular to the first direction. Accordingly, it is advantageously possible both to ensure easy displaceability of the component (Headrest) along the manually operated fixing bars and also to ensure sufficiently secure fixing of the component, in particular in relation to vibrational movements ("rattling").

Furthermore, in one embodiment, it is preferred that the tolerance compensation members is also in contact with the fixing bar during a displacement of the fixing bar relative to the fixing device in the first direction. Contact during movement ensures that sufficient support and, in particular, sufficient protection against vibration is provided in any use situation.

Furthermore, in one embodiment, it is preferred that a movement of the tolerance compensation member or means in the second direction is possible counter to a frictional force of the fixing device in relation to the tolerance compensation member. By this tolerance compensation member, it is advantageously possible to combine the two objectives of, on the one hand, the device being fixed in an as stable and secure manner as possible and, on the other hand, of the device being easily displaceable along the fixing bars, by the fact that the tolerance compensation member is possible with regard to compensating for tolerances of the component or of the fixing bars of the component in a plane perpendicular to the first direction, but that the tolerance compensation member is arranged and is connected to the fixing device in such a manner that, in relation to accidental movements or vibrational movements of the fixing bar or of the component, the tolerance compensation member overall has an effect in obstructing or preventing this movement.

In one embodiment of the present invention, it is furthermore preferred that the tolerance compensation member is in contact with the fixing bar at at least three points in a plane perpendicular to the first direction. This advantageously ensures good fixing and good securing of the component or of the fixing bar of the component in the device against all vibrational movements and the like which occur.

In one aspect, the tolerance compensation member completely surrounds the fixing bar in a plane perpendicular to the first direction. The tolerance compensation member can be produced in a simple manner as a disk-like device. In the interior, the tolerance compensation member can preferably have a shape matched to the cross section of the fixing bar and, on the exterior, the tolerance compensation member can assume a shape matched to the cross section of the device or to the device receiving location, to which the tolerance compensation member is fastened.

In another aspect, the tolerance compensation member is elastically deformable in the first direction by means of the device and by means of a compressive force. In this manner, a frictional force of the device in relation to the tolerance compensation member can be realized in a simple and cost-effective manner.

In another aspect, the tolerance compensation member comprises a material having a low coefficient of friction, in particular in the region of contact between the tolerance compensation member and the fixing bar. This furthermore reduces the forces required for adjusting the component along the longitudinal extent of the fixing bars.

In one particular aspect, the device is a headrest guide or sleeve device and/or component that has two fixing bars. It is thereby possible to better impose guidance or a movement three-dimensionally when adjusting the component along the longitudinal extent of the fixing bars, i.e. an adjustment in the first direction.

BRIEF DESCRIPTION OF THE DRAWINGS

FIG. 1 is a partial cut-away of a guide device as disclosed;

FIG. 2 is a perspective view of a fixing device of the guide device of FIG. 1;

FIG. 3 is a cross-section view of the guide device of FIG. 1; and

DETAILED DESCRIPTION OF THE PREFERRED EMBODIMENTS

Figure 4:
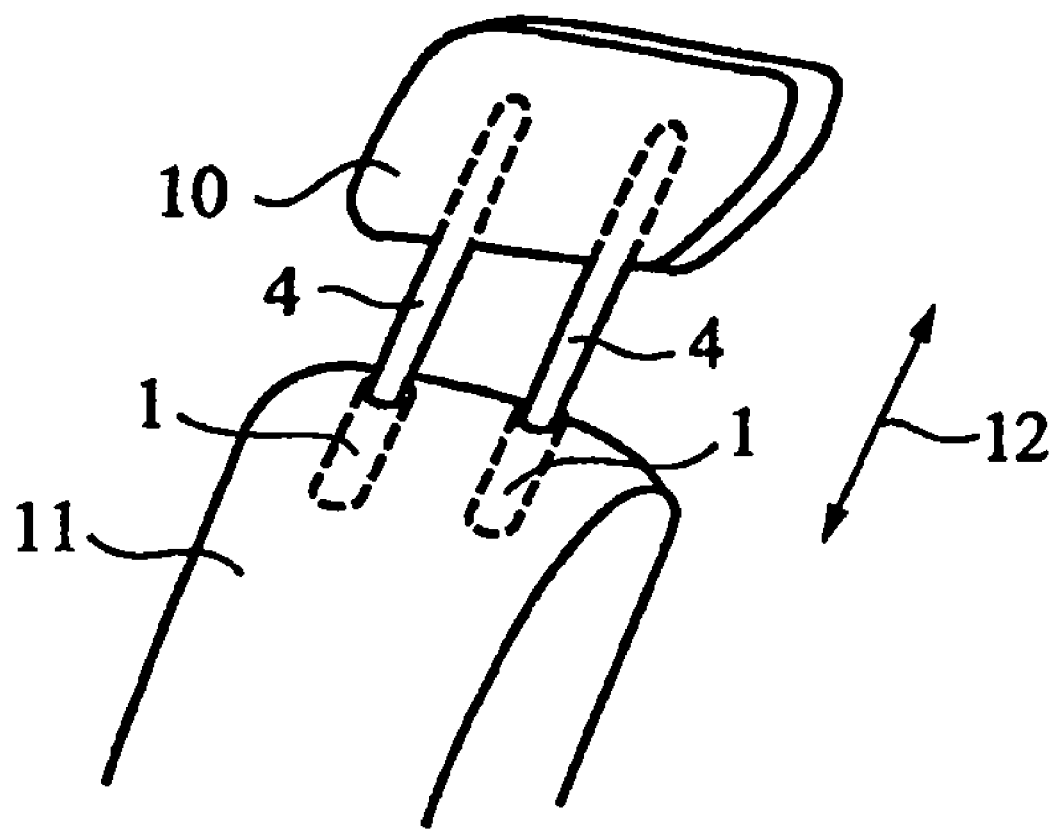
FIG. 4 is a component, in particular a headrest attached to a vehicle seat back, utilizing the guide device and fixing device disclosed.

A guide device according to the present invention is explained in detail below with reference to exemplary embodiments illustrated in the drawings.

Referring generally to FIGS. 1-4, and in particular to FIG. 1, there is shown a device 1 for fixing a component, in particular a headrest (not shown) and in particular in or on a vehicle (not shown). The device 1, which is also referred to below as the guide device 1, comprises, by way of example, in particular a basic body 2 and a sleeve type region 3. The sleeve region 3 serves to receive a fixing or retaining bar 4 which serves to fix and fasten the component. In a partial region of its basic body 2, the guide device 1 has a recess 6, which is also referred to below as slot 6, in which a tolerance compensation member 7, which is also referred to below as a fitting piece 7, is situated. The recess 6 has a height d1 for accommodating the tolerance compensation means or member 7.

FIG. 4 illustrates a use scenario or a use situation of the device 1 as part of a vehicle seat. A headrest 10 as an example of a component 10 is situated on a backrest 11 of a seat (not fully illustrated) for use in a vehicle. The headrest 10 is connected to the backrest 11 of the seat by means of a pair of retaining bars 4. The headrest 10 is fastened in that it is connected to the backrest 11 in a manner such that it can be displaced or adjusted in height in the direction of the double arrow denoted by the reference number 12. In the use example illustrated in FIG. 4, the device 1 is connected fixedly to the backrest 11 of the seat, and the retaining bars 4 are connected fixedly to the headrest 10, so that a height adjustment of the headrest 10 relative to the backrest 11 takes place by means of a displacement of the retaining bars 4 together with the headrest 10. Of course, it can conversely also be provided (not illustrated) that the device 1 is integrated in the headrest and that the retaining bars 4 are connected fixedly to the backrest 1, so that, with the retaining bars 4 fixed, a height-adjustability of the headrest 10 is realized by the device 1 being moved along the retaining bars 4 together with the height-adjustable headrest 10.

The device 1, in its sleeve-like region 3, preferably at that end of the sleeve-like region 3 which is opposite the recess 6, has at least one, but preferably a plurality of projections 5 by means of which the arrangement of the device 1 relative to the retaining bar 4 is defined. In particular, the projections 5 are distributed around the outer contour of the retaining bar 4. The projections 5 serve to arrange the retaining bar 4 relative to the device 1 in a defined manner.

The tolerance compensation members (or means) 7, which is arranged in the recess 6 or the slot 6, is illustrated in a perspective illustration in FIG. 2. The fitting piece 7 or the tolerance compensation member 7 is provided with a central recess 8 and a plurality of inwardly projecting further projections 9. The further projections 9 bear against the retaining bar 4, in particular in a manner similar to the projections 5. By this means, at the two opposite ends of the device 1, a fixing of the device 1 in relation to the retaining bar 4 or conversely a fixing of the retaining bar 4 in relation to the device 1 is realized, this fixing, firstly, being stable or providing a stable support and, secondly, being easy to move in relation to a first direction, which is denoted in FIG. 1 by an arrow and the reference number A and which corresponds to the longitudinal extent of the retaining bars 4 (i.e., runs parallel thereto). Both the projections 5 and the further projections 9 are preferably manufactured from a material with a low coefficient of friction, for example polyoxymethylene (POM) or polyamide (PA), in order to bring about a particularly great ease with which the retaining bars 4 are displaced in the first direction A.

However, in practice, it is the case that there are dimensional tolerances or arrangement tolerances of the retaining bars 4, in particular if a single headrest 10 has two retaining bars 4 running essentially parallel to each other. In such a case, for example, the two retaining bars 4 do not run completely parallel to each other. In the case of a completely rigid arrangement of the fastening points of the retaining bars 4 in the device 1, i.e. with a fixed arrangement of the projections 5 or of the further projections 9 in the arrangement 1, the dimensional tolerance would therefore result in stresses leading to an increase in the resistance to a displacement of the retaining bars 4 in the first direction A. According to the invention, it is now possible, in a surprisingly simple manner with the tolerance compensation member 7, which is displaceable in relation to the device 1, to ensure both an easy and simple displaceability of the retaining bars 4 and also a stable fixing of the component 10. For this purpose, the tolerance compensation member 7 is arranged displaceably in the recess 6 in at least a second direction B (cf. FIG. 1) essentially perpendicular to the first direction A, with the arrangement of the tolerance compensation member 7 in the device 1 being provided in such a manner that a displacement in the second direction B is countered by a resistance which is preferably composed of a frictional force or comprises such a force. This frictional force can be realized with particularly simple means by the fact that the recess 6 or the slot 6 has a lower height d1 than corresponds to the height d2 of the tolerance compensation member 7 (cf. FIG. 2). To install the tolerance compensation member 7 in the basic body 2 of the device 1, it is therefore necessary, according to the invention, for the tolerance compensation member 7 to be pressed into the device 1 and to be held there under prestress (in the first direction A). Owing to the relatively small construction space in the slot 6, a compressive force is therefore exerted on the tolerance compensation member 7 in the first direction A, which leads in particular to an elastic deformation of the tolerance compensation member 7. By means of the compressive force exerted on the tolerance compensation member 7 by the device 1 or its basic body 2, a frictional force is realized which opposes a displacement of the tolerance compensation member 7 in the slot 6. According to the invention, such a displacement is possible because the recess 6 for the tolerance compensation member 7, as is clear from FIG. 3, permits a greater width b1 than the width b2 of the tolerance compensation member 7. The tolerance compensation member 7 or the fitting piece 7 can therefore be displaced in the device 1 or in the basic body 2 of the device 1 by the difference between the clear width b1 of the slot 6 and the extension b2 of the fitting piece 7 in the second direction B. According to the invention, the same can be provided in a third direction C (cf. FIG. 3) perpendicular both to the first direction A and to the second direction B, i.e. there is mobility of the tolerance compensation member 7 in both directions B and C which are perpendicular to the first direction A. However, according to the invention, it can alternatively be provided that the mobility of the tolerance compensation member 7 is provided exclusively in the second direction B and is not provided in the third direction C. In this case, it is then also possible for the compressive force causing the frictional force to be exerted not in the first direction A but rather in the third direction C on the tolerance compensation member 7.

In FIG. 3, as already indicated, a cross-sectional illustration through the tolerance compensation member 7 along a projection direction parallel to the first direction A is illustrated, with it being possible to see the tolerance compensation member 7, its further projections 9, the retaining bar 4 and the basic body 2 or the sleeve-like region 3. FIG. 3 also reveals the clear width b1 of the slot 6 and the extension b2 of the tolerance compensation member 7 in the second direction B, so that it is definite that the tolerance compensation member 7 can be displaced in the second direction B by the amount of the difference between b1 and b2. By this means, tolerances which the retaining bars 4 have in their arrangement can be compensated for by the fact that, by means of such a continuous exertion of force of the retaining bars 4 on the fitting piece 7, a displacement of the fitting piece 7 in relation to the device 1 is brought about counter to the frictional force (not illustrated). Following such a displacement, an easy displaceability of the retaining bars 4 in the first direction in relation to the device 1 is then in turn possible. By contrast, however, it is the case that, when accidental movements or forces of the retaining bar 4 occur on the tolerance compensation member 7, a rattling or vibration of the components 10 is opposed by the existence of the frictional forces between the device 1 and the tolerance compensation member 7. The fitting piece 7 can therefore be displaced relative to the basic body 2 in the plane perpendicular to the first direction A, but with a rattling of the fitting piece 7 in the slot 6 being prevented by the prestress.

According to the invention, the sleeve-like region 3 of the device 1 is provided in such a manner that the projections 5 preferably bear resiliently against the retaining bar 4. By means of the possibility of displacing the tolerance compensation means 4, a displacement of the headrest 10 on the retaining bar 4 or a displacement of the retaining bars 4, with the latter not being aligned completely parallel to each other, leads to a displacement of the fitting piece 7 in the slot 6, with the result that the incomplete parallelism of the retaining bars 4 is compensated for and a jamming of the basic body 2 or of the device 1 on the retaining bars 4 is avoided.

The invention claimed is:

1. A device for fixing a headrest for a vehicle, the device comprising:
    at least one fixing bar having a longitudinal extent and being displaceable relative to the device in a first direction aligned parallel to its longitudinal extent; and
    a tolerance compensation member contacting the fixing bar, the tolerance compensation member being displaceable in relation to the device in a second direction aligned perpendicularly to the first direction,
    wherein the tolerance compensation member is configured such that movement of the tolerance compensation member in the second direction is counter to only a frictional force of the device acting on the tolerance compensation member, and
    wherein the tolerance compensation member is elastically deformed in the first direction by the device exerting a compressive force on the tolerance compensation member.

2. The device as claimed in claim 1, wherein the tolerance compensation member is also in contact with the fixing bar during a displacement of the fixing bar relative to the device in the first direction.

3. The device as claimed in claim 1, wherein the tolerance compensation member is provided with a central recess and a plurality of inwardly projecting projections, and wherein the projections bear against the fixing bar.

4. The device as claimed in claim 1, wherein the tolerance compensation member is in contact with the fixing bar at least three points in a plane essentially perpendicular to the first direction.

5. The device as claimed in claim 4, wherein the tolerance compensation member comprises a material with a low coefficient of friction where the compensation member contacts the fixing bar.

6. The device as claimed in claim 1, further comprising a basic body having a recess in which the tolerance compensation member is situated.

7. The device as claimed in claim 6, wherein the tolerance compensation member is arranged displaceably in the recess in at least the second direction.

8. The device as claimed in claim 6, wherein the recess has a greater width than a width of the tolerance compensation member in the second direction such that the tolerance compensation member can be displaced in the basic body of the device.

9. The device as claimed in claim 1, further comprising another fixing bar.

10. The device as claimed in claim 1, wherein the device is a guide device.

11. A device for fixing a headrest for a vehicle, the device comprising:
    at least one fixing bar having a longitudinal extent and being displaceable relative to the device in a first direction aligned parallel to its longitudinal extent; and
    a tolerance compensation member contacting the fixing bar, the tolerance compensation member being displaceable in relation to the device in a second direction aligned perpendicularly to the first direction,
    wherein the tolerance compensation member is configured such that movement of the tolerance compensation member in the second direction is counter to only a frictional force of the device acting on the tolerance compensation member, and
    wherein the tolerance compensation member completely surrounds the fixing bar in a plane essentially perpendicular to the first direction.

12. A device for fixing a headrest for a vehicle, the device comprising:
    at least one fixing bar having a longitudinal extent and being displaceable relative to the device in a first direction aligned parallel to its longitudinal extent;
    a tolerance compensation member contacting the fixing bar, the tolerance compensation member being displaceable in relation to the device in a second direction aligned perpendicularly to the first direction; and
    a basic body having a recess in which the tolerance compensation member is situated,
    wherein the tolerance compensation member is configured such that movement of the tolerance compensation member in the second direction is counter to only a frictional force of the device acting on the tolerance compensation member, and
    wherein the frictional force is caused by the recess having a lower height in the first direction than a height of the tolerance compensation member.

13. A device for fixing a headrest for a vehicle, the device comprising:
    at least one fixing bar having a longitudinal extent and being displaceable relative to the device in a first direction aligned parallel to its longitudinal extent; and a tolerance compensation member contacting the fixing bar, the tolerance compensation member being displaceable in relation to the device in a second direction aligned perpendicularly to the first direction, wherein the tolerance compensation member is configured such that movement of the tolerance compensation member in the second direction is counter to only a frictional force of the device acting on the tolerance compensation member, and wherein a compressive force is exerted on the tolerance compensation member in the first direction, which leads to an elastic deformation of the tolerance compensation member, such that the frictional force opposing the movement of the tolerance compensation member is realized.

* * * * *